United States Patent
Kudo et al.

(10) Patent No.: US 11,932,346 B2
(45) Date of Patent: Mar. 19, 2024

(54) SADDLE-TYPE VEHICLE

(71) Applicant: HONDA MOTOR CO., LTD., Tokyo (JP)

(72) Inventors: Takashi Kudo, Tokyo (JP); Yoshiaki Nedachi, Wako (JP); Junya Ono, Tokyo (JP); Jun Adachi, Tokyo (JP)

(73) Assignee: Honda Motor Co., Ltd., Tokyo (JP)

(*) Notice: Subject to any disclaimer, the term of this patent is extended or adjusted under 35 U.S.C. 154(b) by 696 days.

(21) Appl. No.: 17/096,277

(22) Filed: Nov. 12, 2020

(65) Prior Publication Data

US 2021/0147035 A1  May 20, 2021

(30) Foreign Application Priority Data

Nov. 14, 2019  (JP) ................................. 2019-206264

(51) Int. Cl.
*B62M 11/04* (2006.01)
*B62M 9/06* (2006.01)
(Continued)

(52) U.S. Cl.
CPC .............. *B62M 11/04* (2013.01); *B62M 9/06* (2013.01); *F16H 37/02* (2013.01); *F16H 57/031* (2013.01);
(Continued)

(58) Field of Classification Search
CPC ......... B62M 11/04; B62M 9/06; F16H 37/02; F16H 57/031; F16H 57/035;
(Continued)

(56) References Cited

U.S. PATENT DOCUMENTS 7,546,829 B2 * 6/2009 Samoto
7,938,036 B2 * 5/2011 Mochizuki
(Continued)

FOREIGN PATENT DOCUMENTS

| JP | 2007-198586 A | 8/2007 |
| JP | 2018-027716 A | 2/2018 |
| WO | 2017/135315 A1 | 8/2017 |

OTHER PUBLICATIONS

Office Action dated Aug. 31, 2021 issued in the corresponding Japanese Patent Application No. 2019-206264.
(Continued)

*Primary Examiner* — James A Shriver, II
*Assistant Examiner* — Nicholas R. Kandas
(74) *Attorney, Agent, or Firm* — Carrier, Shende & Associates P.C.; Joseph P. Carrier; Jeffrey T. Gedeon

(57) ABSTRACT

A saddle-type vehicle includes a power unit including a multistage transmission having a plurality of gear positions, a transmission actuating mechanism for changing the gear positions, a shift spindle as an input shaft of the transmission actuating mechanism, a crankcase housing therein the multistage transmission and the transmission actuating mechanism, and a crankcase cover covering a side portion of the crankcase. The shift spindle is disposed in the periphery of the crankcase cover and is coupled to a shift actuator mounted on the crankcase cover by a joint rod. Such saddle-type vehicle having a power unit with a shift spindle movable by a shift actuator, in which the shift spindle and the shift actuator are combined with each other in a small-size layout with a joint rod joining the shift spindle and the shift actuator to each other, allows the joint rod to be installed in position with ease.

19 Claims, 10 Drawing Sheets

(51) Int. Cl.
    *F16H 37/02*         (2006.01)
    *F16H 57/02*         (2012.01)
    *F16H 57/031*       (2012.01)
    *F16H 57/035*       (2012.01)

(52) U.S. Cl.
    CPC . *F16H 57/035* (2013.01); *F16H 2057/02034* (2013.01); *F16H 2057/02065* (2013.01); *F16H 2200/0021* (2013.01); *F16H 2702/00* (2013.01)

(58) Field of Classification Search
    CPC . F16H 2057/02034; F16H 2057/02065; F16H 2200/0021; F16H 2702/00
    See application file for complete search history.

(56)     References Cited

U.S. PATENT DOCUMENTS

| | | |
|---|---|---|
| 8,365,621 B2 | 2/2013 | Matsumoto et al. |
| 10,953,954 B2 * | 3/2021 | Takahashi |
| 2019/0203835 A1 | 7/2019 | Sugano et al. |

OTHER PUBLICATIONS

Office Action dated Jun. 18, 2021 issued in the corresponding Indian Patent Application No. 202044048871.

\* cited by examiner

SADDLE-TYPE VEHICLE

TECHNICAL FIELD

The present invention relates to a saddle-type vehicle including a shift actuator for actuating a shift spindle of a multistage transmission.

BACKGROUND ART

Patent Document 1 referred to below, for example, discloses a saddle-type vehicle in which a shift spindle of a multistage transmission in a power unit is actuated by a shift actuator mounted on a vehicle body frame through a joint rod. However, the saddle-type vehicle disclosed in Patent Document 1 is problematic in that, as the shift actuator is mounted on the vehicle body frame, the joint rod tends to be large in size.

PRIOR ART DOCUMENT

Patent Document

Patent Document 1: JP2007-198586A (FIGS. 5, 10, and 12)

SUMMARY OF THE INVENTION

Underlying Problem to be Solved by the Invention

The present invention has been made in view of the above conventional art. It is an object of the present invention to provide a saddle-type vehicle having a power unit with a shift spindle angularly movable by a shift actuator, in which the shift spindle and the shift actuator are combined with each other in a small-size layout with a small-size joint rod joining the shift spindle and the shift actuator to each other, allowing the joint rod to be installed in position with ease.

Means to Solve the Problem

In order to solve the above problem, there is provided, according to a preferred embodiment of the present invention, a saddle-type vehicle including a power unit including a multistage transmission having a plurality of gear positions, a transmission actuating mechanism for changing the gear positions, a shift spindle acting as an input shaft of the transmission actuating mechanism, a crankcase housing therein the multistage transmission and the transmission actuating mechanism, and a crankcase cover covering a side portion of the crankcase, in which
the shift spindle is disposed in the periphery of the crankcase cover and is coupled to a shift actuator mounted on the crankcase cover by a joint rod.

With the above arrangement, since the shift spindle and the shift actuator are disposed and positioned closely to each other in the periphery of the crankcase cover, the shift spindle and the shift actuator are combined with each other in a small-size layout. Further, as both the shift spindle and the shift actuator are mounted on the power unit, the joint rod that couples the shift spindle and the shift actuator to each other is reduced in size and can be installed in position with ease.

According to the preferred embodiment of the present invention, the shift actuator includes a gear box and an electric motor, the gear box being integrally formed with the crankcase cover.

Because the gear box is integrally formed with the crankcase cover, the gear box does not need to be formed as an independent part, resulting in a reduction in the number of parts used.

According to the preferred embodiment of the present invention, the crankcase cover is a drive sprocket cover mounted on the side portion of the crankcase and covering a drive sprocket, and the shift actuator is mounted on an upper surface of the drive sprocket cover.

Therefore, a wide space over the upper surface of the drive sprocket cover extending in forward and rearward directions along a drive chain extending between the drive sprocket and a driven sprocket on a rear wheel is effectively used to accommodate the shift actuator.

According to the preferred embodiment of the present invention, the joint rod has an upper end portion inclined forwardly with respect to its lower end portion as viewed in side elevation of the vehicle.

Consequently, the lower end portion of the joint rod can be brought closely to a lower edge of the drive sprocket cover, and can be prevented from protruding.

According to the preferred embodiment of the present invention, the joint rod is positioned closer to the center of the vehicle than an outer side surface of the drive sprocket cover as viewed in front elevation of the vehicle.

Therefore, the joint rod is protected from contacting the rider's leg.

According to the preferred embodiment of the present invention, the electric motor of the shift actuator has a motor shaft oriented in forward and rearward directions of the vehicle along the direction of a drive chain trained between the drive sprocket and a driven sprocket on a rear wheel of the vehicle.

As the motor shaft of the electric motor of the shift actuator that is oriented in the forward and rearward directions is disposed over the upper surface of the drive sprocket cover that extends in the forward and rearward directions, the shift actuator is disposed in a compact layout.

According to the preferred embodiment of the present invention, a gear box cover is mounted on the gear box, and the electric motor is detachably mounted on the gear box.

Therefore, the electric motor can be mounted on and detached from the gear box without the need for disassembling the gear box and the gear box cover. The electric motor thus has increased maintainability.

According to the preferred embodiment of the present invention, the shift actuator to which power of the electric motor is transmitted has an output shaft extending through the gear box cover, and the electric motor is mounted on the gear box with the motor shaft extending into the gear box from a side that is remote from the gear box cover.

The output shaft of the shift actuator and the motor shaft of the electric motor are disposed respectively on opposite sides of the gear box. Therefore, both increased layout freedom of the output shaft and increased maintainability of the electric motor are accomplished at the same time.

According to the preferred embodiment of the present invention, the gear box houses therein a plurality of speed reducer gear shafts parallel to the motor shaft, and the plurality of speed reducer gear shafts and the output shaft are disposed around the motor shaft so as to surround the motor shaft.

Therefore, the gear box is prevented from being increasing in size due to an increased number of speed reduction ratios.

According to the preferred embodiment of the present invention, the gear box houses therein a final-stage speed reducer gear that is a sector gear mounted on the output shaft and is disposed in overlapping relation to the motor shaft as viewed along its axis.

It is thus possible to reduce the size of the gear box of the shift actuator.

According to the preferred embodiment of the present invention, one of the speed reducer gear shafts has a smaller-diameter speed reducer gear held in mesh with the final-stage speed reducer gear on the output shaft and a larger-diameter speed reducer gear disposed, at least partially, in overlapping relation to the motor shaft as viewed along its axis.

It is thus possible to reduce the size of the gear box of the shift actuator.

According to the preferred embodiment of the present invention, the joint rod couples the output shaft and the shift spindle to each other and is positioned between an alternating current (AC) generator cover and the drive sprocket cover as viewed in side elevation of the vehicle.

Therefore, the joint rod stays clear of portions of the AC generator cover and the drive sprocket cover that bulge sideways of the vehicle, and is restrained from protruding sideways of the vehicle.

According to the preferred embodiment of the present invention, the joint rod that couples the output shaft and the shift spindle to each other is positioned closer to the center of the vehicle than the AC generator cover as viewed in rear elevation of the vehicle.

Consequently, the joint rod is protected from flipped pebbles and stones from the front of the vehicle by a portion of the AC generator cover that bulges sideways of the vehicle forwardly with respect to the joint rod.

According to the preferred embodiment of the present invention, the power unit is disposed below a backbone frame extending rearwardly from a head pipe, and the electric motor of the shift actuator has a motor axis covered with a lower edge of a vehicle body cover that extends forwardly downwardly and rearwardly upwardly as viewed in side elevation of the vehicle.

Consequently, the shift actuator is protected by the vehicle body cover from rainwater that flows downwardly from an upper portion of the vehicle, and the electric motor is cooled by ram air as the electric motor is partly exposed. In addition, the appearance is improved.

According to the preferred embodiment of the present invention, the power unit is mounted on a vehicle body frame below a backbone frame that extends rearwardly from a head pipe, an upper engine hanger extending downwardly from the backbone frame and supporting an upper portion of the crankcase and the shift actuator are disposed in respective positions that are staggered in forward and rearward directions of the vehicle as viewed in side elevation of the vehicle, and the electric motor is disposed at a corner defined between a horizontal hypothetical line extending along the upper surface of the drive sprocket cover and a vertical hypothetical line extending along an outer side surface of the upper engine hanger, as viewed in rear elevation of the vehicle.

Consequently, fastening bolts can be installed easily and efficiently to fasten the upper engine hanger and the power unit to each other, and the shift actuator is prevented from protruding sideways and protected well.

Effects of the Invention

In the saddle-type vehicle according to the present invention, since the shift spindle and the shift actuator are disposed and positioned closely to each other in the periphery of the crankcase cover, the shift spindle and the shift actuator are combined with each other in a small-size layout. Furthermore, as both the shift spindle and the shift actuator are mounted on the power unit, the joint rod that couples the shift spindle and the shift actuator to each other is reduced in size and can be installed in position with ease.

MODE FOR CARRYING OUT THE INVENTION

Figure 1:
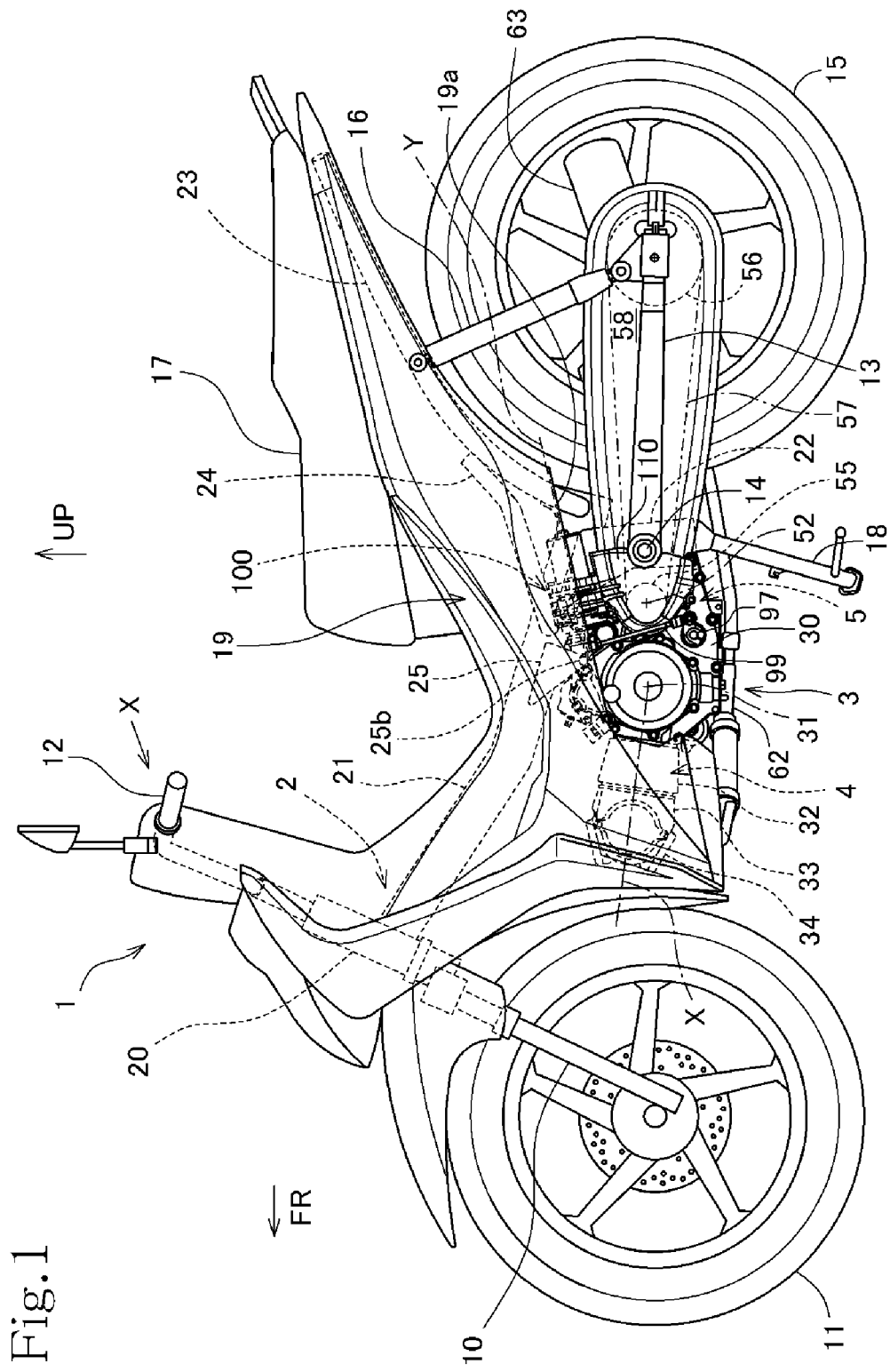
FIG. 1 is a left side elevational view of a motorcycle according to an embodiment of the present invention.

A motorcycle according to an embodiment of the present invention will be described below with reference to FIGS. 1 through 10.

Directions including forward, rearward, leftward, rightward, upward, and downward directions and similar directional expressions used below will be based on the directions of the motorcycle according to the present embodiment. In the drawings, an arrow FR refers to a forward direction of the motorcycle, an arrow LH refers to a leftward direction of the motorcycle, an arrow RH refers to a rightward direction of the motorcycle, and an arrow UP refers to an upward direction of the motorcycle.

FIG. 1 illustrates, in left side elevation, the motorcycle, denoted by 1, according to the directions of the present embodiment. The motorcycle 1 according to the present embodiment represents a saddle-type vehicle according to the present invention.

As illustrated in FIG. 1, the motorcycle (i.e., saddle-type vehicle according to the present invention) 1 includes a vehicle body frame 2 having a main frame 21 extending, as a backbone frame, obliquely rearwardly and downwardly from a head pipe 20, a pair of left and right pivot plates 22 hanging downwardly from a rear end portion of the main frame (i.e., backbone frame according to the present invention) 21, a pair of left and right rear frames 23 extending obliquely rearwardly and upwardly from the rear end of the main frame 21, and a pair of sub-frames 24 extending between the main frame 21 and the rear frames 23.

A front fork 10 that is angularly movably supported on the head pipe 20 extends obliquely forwardly and downwardly, and a front wheel 11 is rotatably mounted on the lower end of the front fork 10. A steering handle 12 is mounted on the upper end of the front fork 10.

A swing arm 13 has a front end angularly movably supported on the pivot plates 22 by a pivot shaft 14. A rear wheel 15 is rotatably supported on the rear end of the swing arm 13.

A rear cushion 16 is interposed between the swing arm 13 and one of the rear frames 23 above the swing arm 13. A rider's seat 17 is supported above the rear frames 23 and the sub-frames 24 with a storage box and a fuel tank, not illustrated, disposed below the rider's seat 17.

The vehicle body frame 2 and various devices supported thereon are covered with a vehicle body cover 19.

A main stand 18 is attached to lower portions of the pivot plates 22.

An upper engine hanger 25 protrudes downwardly from a rear portion of the main frame 21 that extends rearwardly from the center of the main frame 21. A power unit 3 is supported on the upper engine hanger 25 and the pivot plates 22 and is suspended from the vehicle body frame 2.

The power unit 3 includes a four-stroke-cycle, single-cylinder, air-cooled internal combustion engine 4 and a multistage transmission 5 housed in a crankcase 30 of the internal combustion engine 4.

Figure 2:
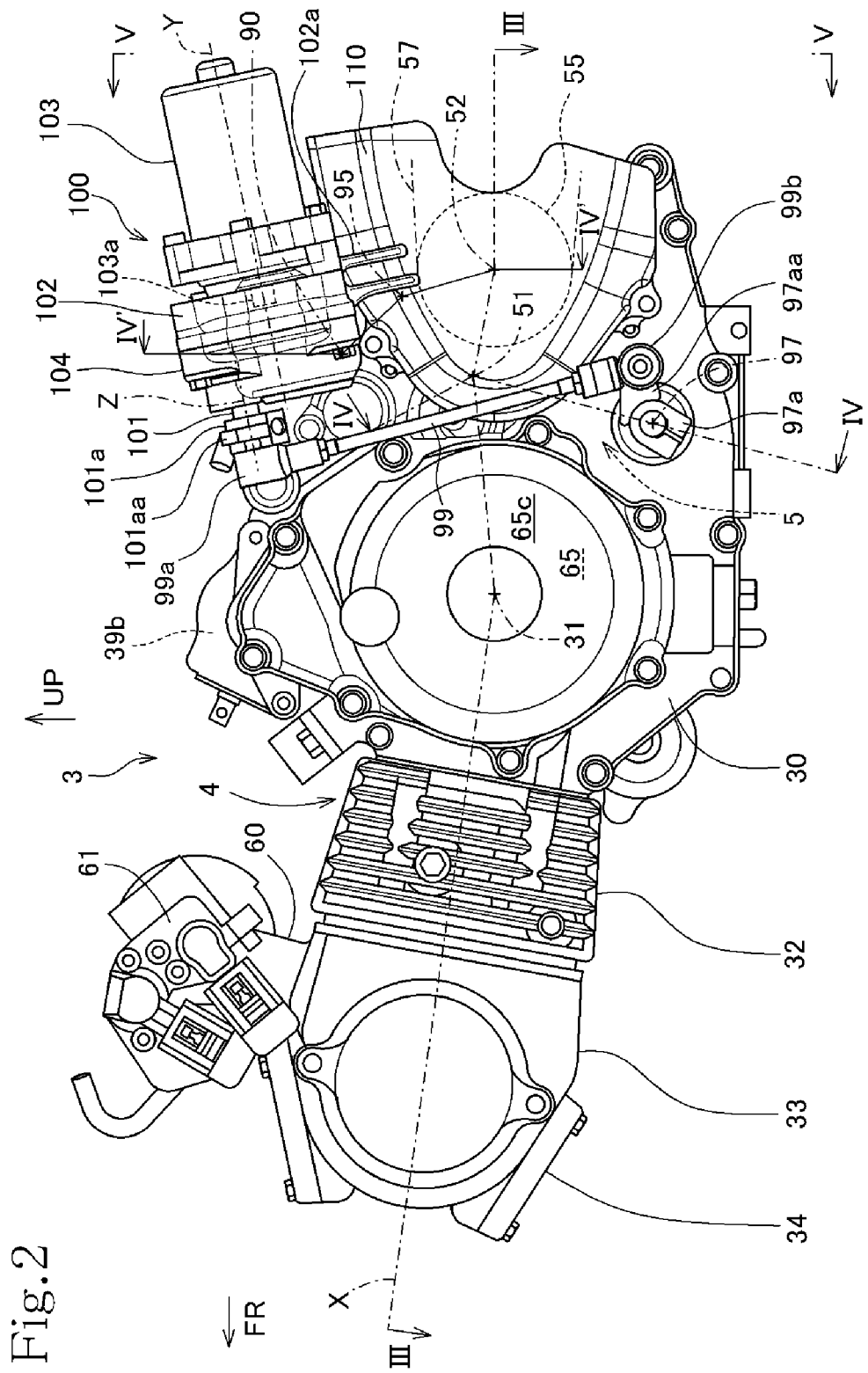
FIG. 2 is an enlarged left side elevational view of a power unit mounted on the motorcycle illustrated in FIG. 1.

FIG. 2 illustrates, in enlarged left side elevation, the power unit 3 extracted from the motorcycle 1 in FIG. 1.

As illustrated in FIG. 2, the internal combustion engine 4 includes a cylinder block 32 and a cylinder head 33 successively stacked on and protruding forwardly from the crankcase 30. A head cover 34 is mounted on the cylinder head 33.

The power unit 3 is mounted on the vehicle body frame 2 transversely, the power unit having a crankshaft 31 of the internal combustion engine 4 oriented in leftward and rightward directions. The cylinder block 32 has a cylinder axis X inclined forwardly so as to lie substantially horizontally.

Figure 3:
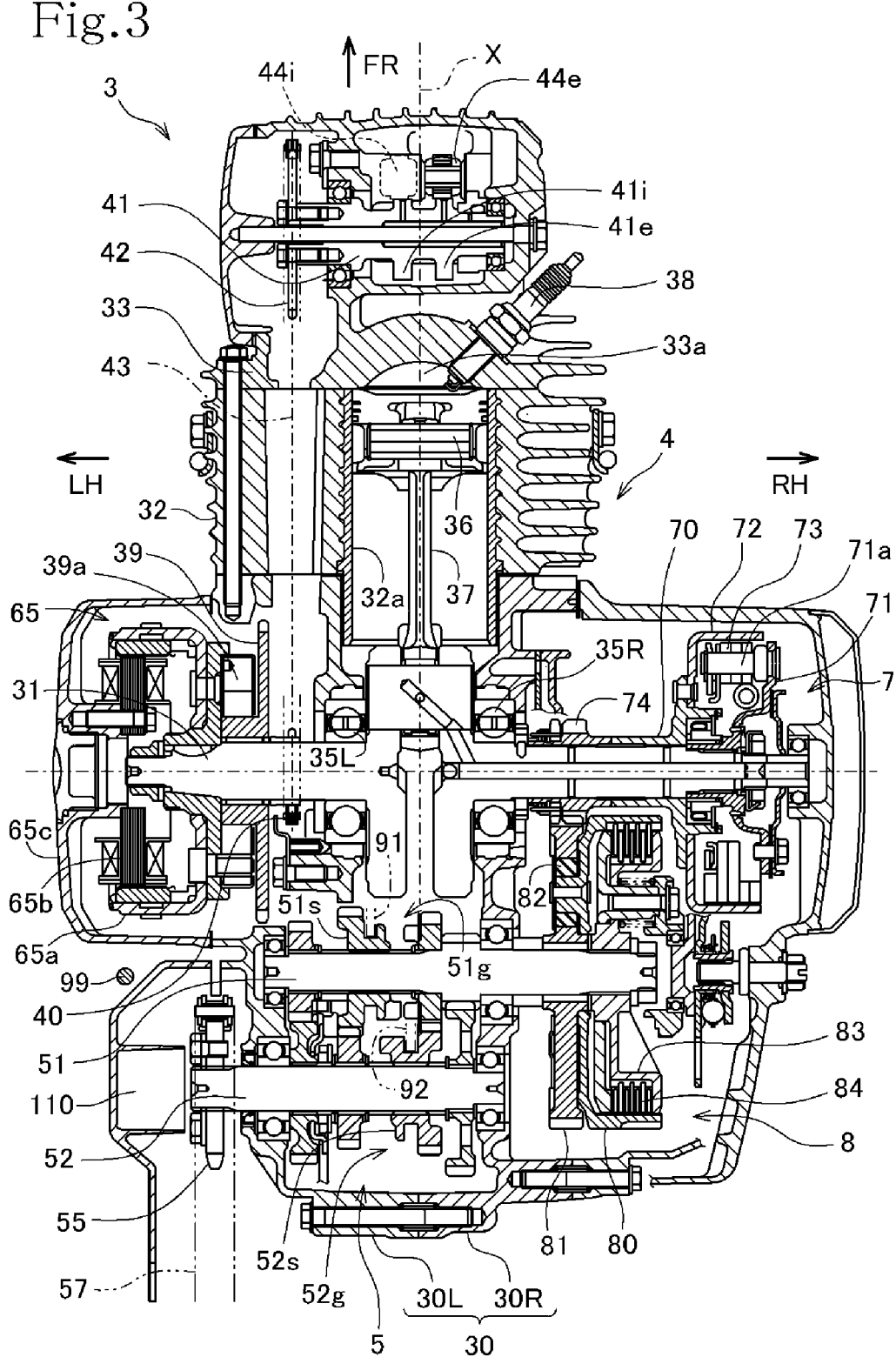
FIG. 3 is a cross-sectional development view of the power unit taken along line III-III of FIG. 2.

FIG. 3 illustrates the power unit 3 in cross sectional development taken along line III-III of FIG. 2.

As illustrated in FIG. 3, the crankcase 30 is of a structure separable into a left case 30L and a right case 30R that are fastened to each other.

The multistage transmission 5 that is housed in the crankcase 30 is a normally-meshing-gear-type multistage transmission. The multistage transmission 5 includes a main shaft 51 and a countershaft 52 that extend parallel to the crankshaft 31, a main-shaft transmission gear group 51g on the main shaft 51, and a countershaft transmission gear group 52g on the countershaft 52. The main-shaft transmission gear group 51g and the countershaft transmission gear group 52g form a plurality of gear positions.

The countershaft 52 that acts as an output shaft of the multistage transmission 5 and also as an output shaft of the power unit 3 projects to the left from a rear portion of the crankcase 30. A drive sprocket 55 is fitted over a projecting end of the countershaft 52. A drive chain 57 is trained around the drive sprocket 55 and a driven sprocket 56 (see FIG. 1) fitted over the axle of the rear wheel 15. Power of the internal combustion engine 4 is transmitted through the drive chain 57 to the rear wheel 15.

An intake pipe 60 extends upwardly from an upper surface of the cylinder head 33 that is oriented substantially horizontally in a forward direction. The intake pipe 60 is connected through a throttle body 61 (see FIG. 2) including a fuel injection valve disposed integrally therein to an air cleaner, not illustrated, mounted on the main frame 21.

As illustrated in FIG. 1, an exhaust pipe 62 that extends downwardly from a lower surface of the cylinder head 33 is bent rearwardly and connected to a muffler 63 disposed rearwardly with respect to the crankcase 30 and on a right side of the vehicle body frame 2.

As illustrated in FIG. 3, the internal combustion engine 4 in the power unit 3 has its crankshaft 31 rotatably supported on the crankcase 30 by a pair of left and right main bearings 35L and 35R. Reciprocating movement of a piston 36 that is slidably fitted in a cylinder bore 32a defined in the cylinder block 32 is converted into rotary movement of the crankshaft 31 by a connecting rod 37.

The piston 36 has a top end face facing a ceiling face of the cylinder head 33. The top end face of the piston 36 and the ceiling face of the cylinder head 33 jointly define a combustion chamber 33a therebetween. A spark plug 38 is fitted in a ceiling wall of the cylinder head 33 and has an electrode on its distal end exposed in the combustion chamber 33a.

The crankshaft 31 includes a left shaft portion extending leftwardly from the left main bearing 35L. A valve operating system drive sprocket 40, a starter driven gear 39, and an AC generator 65 are successively mounted on the left shaft portion of the crankshaft 31 in a leftward direction from the left main bearing 35L.

A timing chain 43 is trained around the valve operating system drive sprocket 40 that is integrally coupled to the crankshaft 31 and a valve operating system driven sprocket 42 integrally fitted over a valve operating system camshaft 41 that is rotatably supported in the cylinder head 33. When the valve operating system camshaft 41 is rotated about its own axis at a rotational speed that is one-half of the rotational speed of the crankshaft 31 by the crankshaft 31 through the timing chain 43, an intake rocker arm 44i and an exhaust rocker arm 44e that are held in sliding contact with an intake cam 41i and an exhaust cam 41e, respectively, on the valve operating system camshaft 41 swing to open and close an intake valve and an exhaust valve, not illustrated, at a predetermined interval to introduce an air-fuel mixture into and discharge exhaust gases from the combustion chamber 33a in the internal combustion engine 4.

The starter driven gear 39 that is rotatably supported on the crankshaft 31 by a needle bearing is coupled through a one-way clutch 39a to an outer rotor 65a of the AC generator 65 that is integrally coupled to the crankshaft 31.

The AC generator 65 includes an inner stator 65b fixedly supported on an AC generator cover 65c joined to the left case 30L of the crankcase 30.

To the starter driven gear 39, there is transmitted the rotation of the drive shaft of a starter motor 39b (see FIG. 2) protrusively mounted on an upper portion of the crankcase 30 through a speed reducergear mechanism, not illustrated, to start the internal combustion engine 4.

The crankshaft 31 includes a right shaft portion extending rightwardly from the right main bearing 35R. A centrifugal clutch 7 for starting the internal combustion engine 4 is mounted on the right shaft portion of the crankshaft 31. A tubular member 70 is angularly movably supported on the portion of the crankshaft 31 that extends between the centrifugal clutch 7 and the right main bearing 35R.

The centrifugal clutch 7 has a drive plate 71 rotatable in unison with the crankshaft 31 and a cup-shaped clutch outer 72 positioned radially outwardly with respect to the drive plate 71 and rotatable in unison with the tubular member 70. Three clutch shoes 73 in the form of centrifugal weights are swingably supported respectively on three support shafts 71a fixed to the drive plate 71. The clutch shoes 73 have respective linings made of a frictional material on their outer surfaces. The clutch shoes 73 are disposed such that the centers of gravity thereof are positioned behind the support shafts 71a in the direction of rotation of the crankshaft 31. When the crankshaft 31 rotates about its own central axis, the clutch shoes 73 turn in unison therewith and swing radially outwardly under centrifugal forces against clutch springs, not illustrated. When the rotational speed of the crankshaft 31 exceeds a predetermined rotational speed, the clutch shoes 73 are brought into contact with the clutch outer 72, engaging the centrifugal clutch 7 under frictional forces.

A drive gear 74 is integrally formed with the left end of the tubular member 70.

Therefore, before the rotational speed of the crankshaft 31 exceeds the predetermined rotational speed, the centrifugal clutch 7 remains disengaged, and the rotation of the crankshaft 31 is not transmitted to the tubular member 70 and the drive gear 74. When the rotational speed of the crankshaft 31 exceeds the predetermined rotational speed, the centrifugal clutch 7 is engaged, and the rotation of the crankshaft 31 is transmitted to the tubular member 70 and the drive gear 74.

The drive gear 74 is held in mesh with a driven gear 81 coupled through a damper 82 to a clutch outer 80 of a transmission clutch 8 that is rotatably supported on a portion of the main shaft 51 of the multistage transmission 5 that protrudes rightwardly from the crankcase 30.

The transmission clutch 8 is a friction-type multi-plate clutch having a plurality of clutch plates 84 that can be brought into or out of frictional engagement with each other by a release mechanism that is linked to a shift spindle 97 actuated by a shift actuator 100. When the clutch plates 84 are brought into frictional engagement with each other by spring forces, the clutch outer 80 transmits its torque to a clutch inner 83 integrally coupled to the main shaft 51, engaging the transmission clutch 8. When the clutch plates 84 are brought out of frictional engagement with each other, the transmission of the torque from the clutch outer 80 to the clutch inner 83 is interrupted, disengaging the transmission clutch 8.

The multistage transmission 5 is disposed behind the crankshaft 31 in the crankcase 30. The multistage transmission 5 has a plurality of gear positions, as described above, and includes the main shaft 51 with the main-shaft transmission gear group 51g mounted thereon and the countershaft 52 with the countershaft transmission gear group 52g mounted thereon.

According to the present embodiment, the main-shaft transmission gear group 51g includes a shifter gear 51s axially slidable on the main shaft 51, and the countershaft transmission gear group 52g includes a shifter gear 52s axially slidable on the countershaft 52. When the shifter gears 51s and 52s are axially moved to the left or right by a transmission actuating mechanism 9 to engage adjacent gears, a gear of the main-shaft transmission gear group 51g and a gear of the countershaft transmission gear group 52g are selected to mesh with each other for transmitting the rotation from the crankshaft 31 in a gear position to complete a gear shifting operation.

The transmission actuating mechanism 9 for moving the shifter gears 51s and 52s to change gear positions will be described below.

Figure 4:
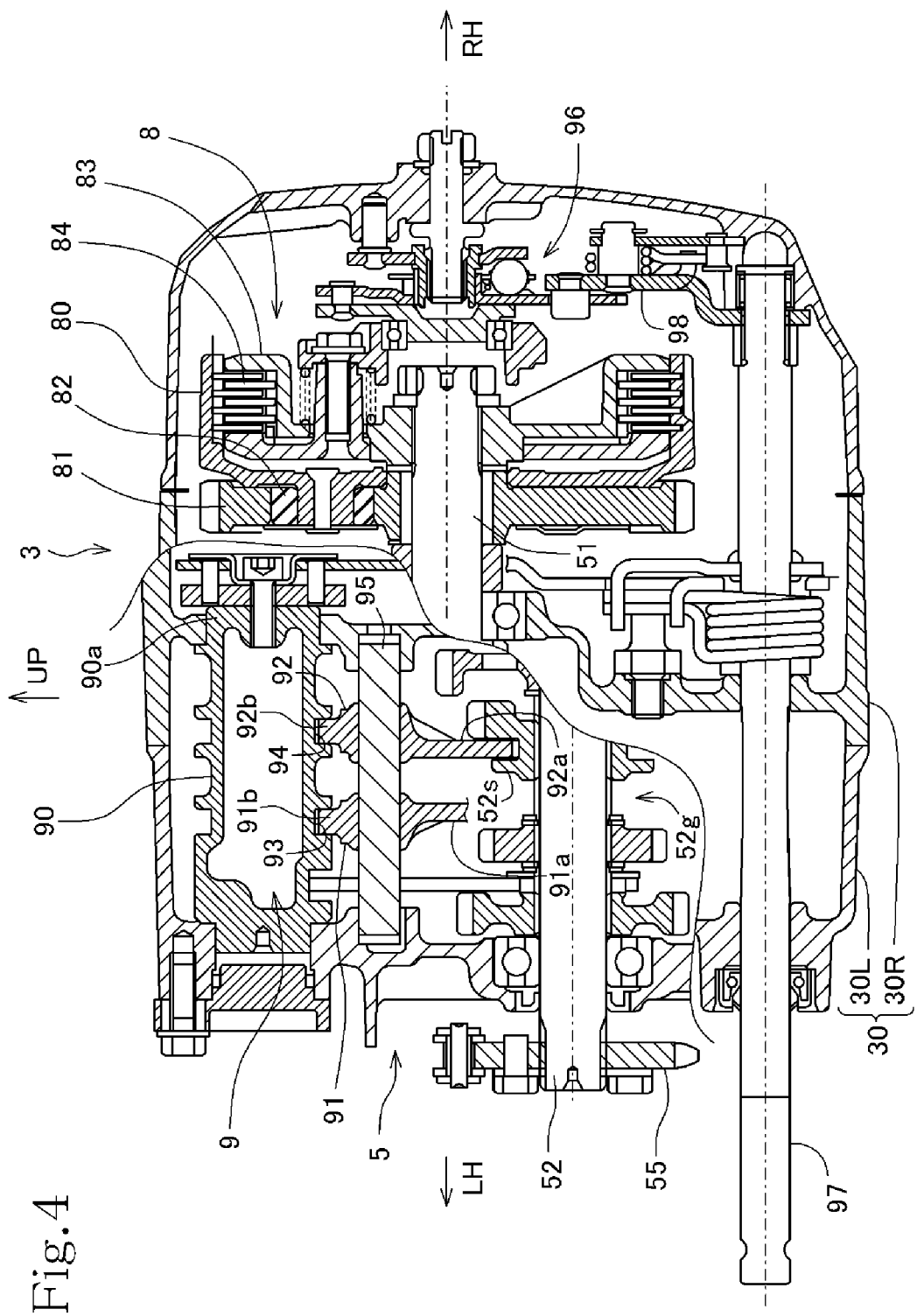
FIG. 4 is an elevational cross-sectional view of the power unit taken along a combination of line IV-IV and line IV'-IV' of FIG. 2.

FIG. 4 illustrates the power unit 3 in elevational cross section taken along a combination of line IV-IV and line IV'-IV' of FIG. 2.

As illustrated in FIG. 4, the transmission actuating mechanism 9 according to the embodiment has a shift drum 90 and two shift forks 91 and 92. When the shift drum 90 is turned about its central axis, it axially moves the shift forks 91 and 92 to move the shifter gears 51s and 52s slidably on the main shaft 51 and the countershaft 52, causing the multistage transmission 5 to change gear positions.

The shift drum 90 is angularly movably supported on left and right side walls of the crankcase 30 and has two axially spaced lead grooves 93 and 94 defined in an outer circumferential surface thereof and extending circumferentially.

A shift fork shaft 95 extends parallel to the central axis of the shift drum 90 and is mounted on the left and right side walls of the crankcase 30 near the shift drum 90. The shift forks 91 and 92 are angularly movably and axially movably supported on the shift fork shaft 95.

The shift fork 91 has a fork portion 91a engaging the shifter gear 51s on the main shaft 51 and a pin portion 91b slidably engaging in the lead groove 93 of the shift drum 90 (see FIG. 3).

The shift fork 92 has a fork portion 92a engaging the shifter gear 52s on the countershaft 52 and a pin portion 92b slidably engaging in the lead groove 94 of the shift drum 90.

Therefore, when the shift drum 90 turns, the shift forks 91 and 92 are axially moved by being guided by the lead grooves 93 and 94, respectively, slidingly moving the shifter gears 51s and 52s in axial directions thereby to change gear positions.

The shift drum 90 has a right end portion 90a associated with an intermittent feed mechanism 96 for intermittently turning the shift drum 90. When the shift drum 90 is turned to a predetermined position by the intermittent feed mechanism 96, the lead grooves 93 and 94 cause the shift forks 91 and 92 to slide to respective positions on the shift fork shaft 95. At this time, the shifter gears 51s and 52s are axially moved by the shift forks 91 and 92 to reach respective positions that cause the multistage transmission 5 to select a certain gear position.

The intermittent feed mechanism 96 is actuated by a master arm 98 fitted over the shift spindle 97 as an input shaft for the transmission actuating mechanism 9 when the shift spindle 97 is turned about its central axis.

According to the present embodiment, when the shift spindle 97 is actuated by the shift actuator 100, the shift spindle 97 causes the intermittent feed mechanism 96 to turn the shift drum 90 intermittently, changing gear positions.

According to the present embodiment, as illustrated in FIG. 1, the drive chain 57 that is trained around the drive sprocket 55 and the driven sprocket 56 is covered with a chain cover 58. The drive sprocket 55 that is positioned forwardly with respect to the chain cover 58 is covered with a drive sprocket cover (i.e., crankcase cover according to the present invention) 110 mounted on the crankcase 30.

According to the present embodiment, as illustrated in FIG. 2, the drive sprocket cover 110 is attached to a left side surface of the crankcase 30, and the shift actuator 100 for angularly moving the shift spindle 97 is disposed over the drive sprocket cover 110. The shift spindle 97 has a left end extending through a lower portion of the left side surface of the crankcase 30 in the periphery of the drive sprocket cover 110, i.e., closely to an outer edge of the drive sprocket cover 110.

The shift actuator 100 has an output shaft 101 coupled to the shift spindle 97 by a joint rod 99.

The location where the shift actuator 100 is positioned is not limited to any place insofar as it is on a cover, namely, the crankcase cover, disposed in covering relation to the side of the crankcase 30 through which the shift spindle 97 extends protrusively, providing other conditions are met.

For example, unlike the present embodiment, the shift actuator 100 may be disposed on the AC generator cover 65*c* or a cover provided as an integral combination of the AC generator cover 65*c* and the drive sprocket cover 110.

The crankcase cover may be the drive sprocket cover 110 mounted on the side portion of the crankcase 30 and covering a drive sprocket 55, and the shift actuator 100 is mounted on an upper surface 110*a* of the drive sprocket cover 110.

Since the shift spindle 97 and the shift actuator 100 are disposed and positioned closely to each other on the cover disposed in covering relation to the side of the crankcase 30 through which the shift spindle 97 extends protrusively, i.e., in the periphery of the crankcase cover referred to above, the shift spindle 97 and the shift actuator 100 are combined with each other in a small-size layout.

Further, as both the shift spindle 97 and the shift actuator 100 are mounted on the power unit 3, the joint rod 99 that couples the shift spindle 97 and the shift actuator 100 to each other is reduced in size and can be installed in position with ease.

Nevertheless, installing the shift actuator 100 on an upper surface 110*a* of the drive sprocket cover 110 as a crankcase cover according to the present embodiment is advantageous in that a wide space over the upper surface 110*a* of the drive sprocket cover 110 extending in forward and rearward directions along the drive chain 57 extending between the drive sprocket 55 and the driven sprocket 56 on the rear wheel 15 is effectively used to accommodate the shift actuator 100.

Figure 5:
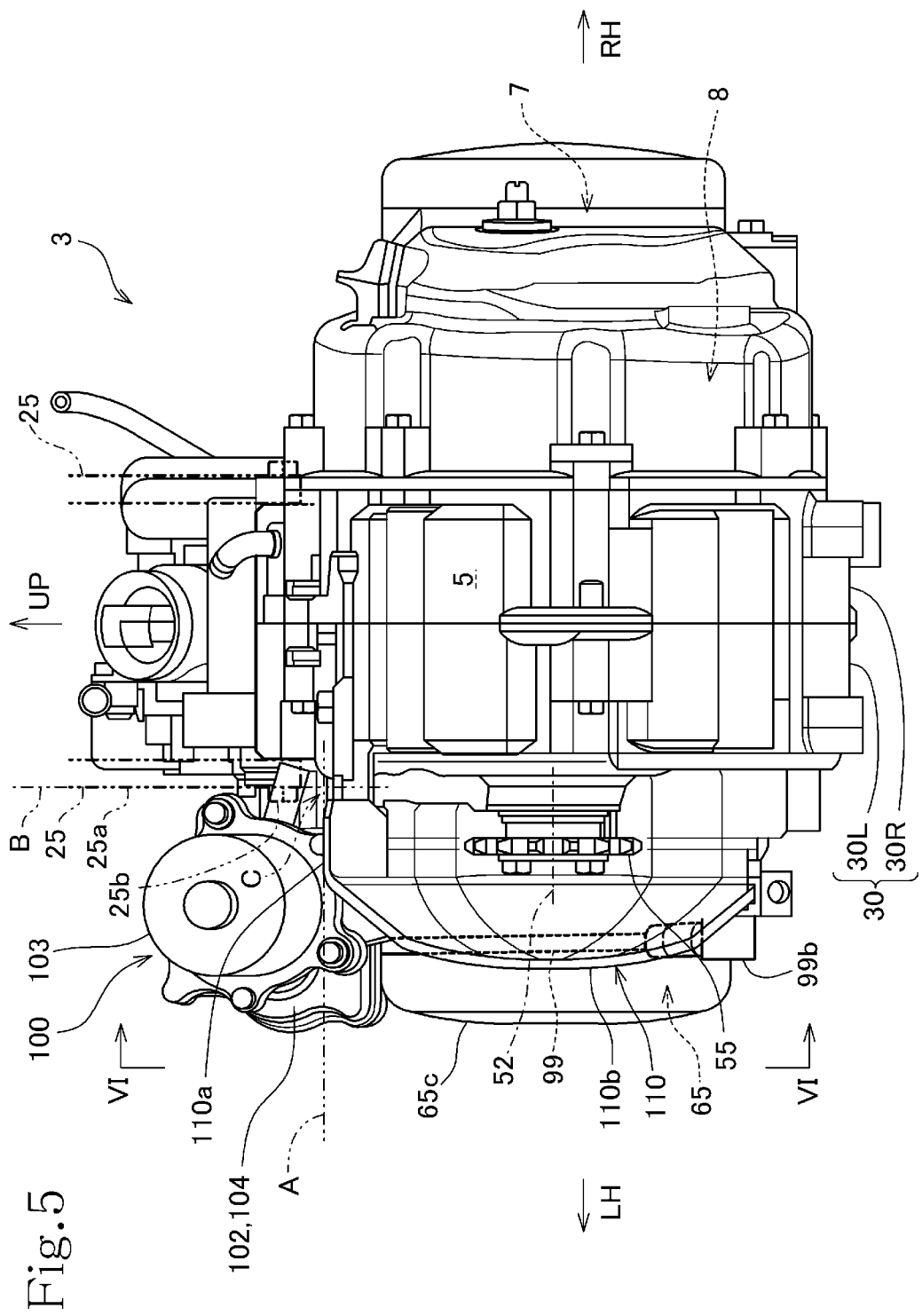
FIG. 5 is a rear elevational view of the power unit taken along line V-V of FIG. 2.

FIG. 5 illustrates the power unit 3 in rear elevation taken along line V-V of FIG. 2.

Figure 6:
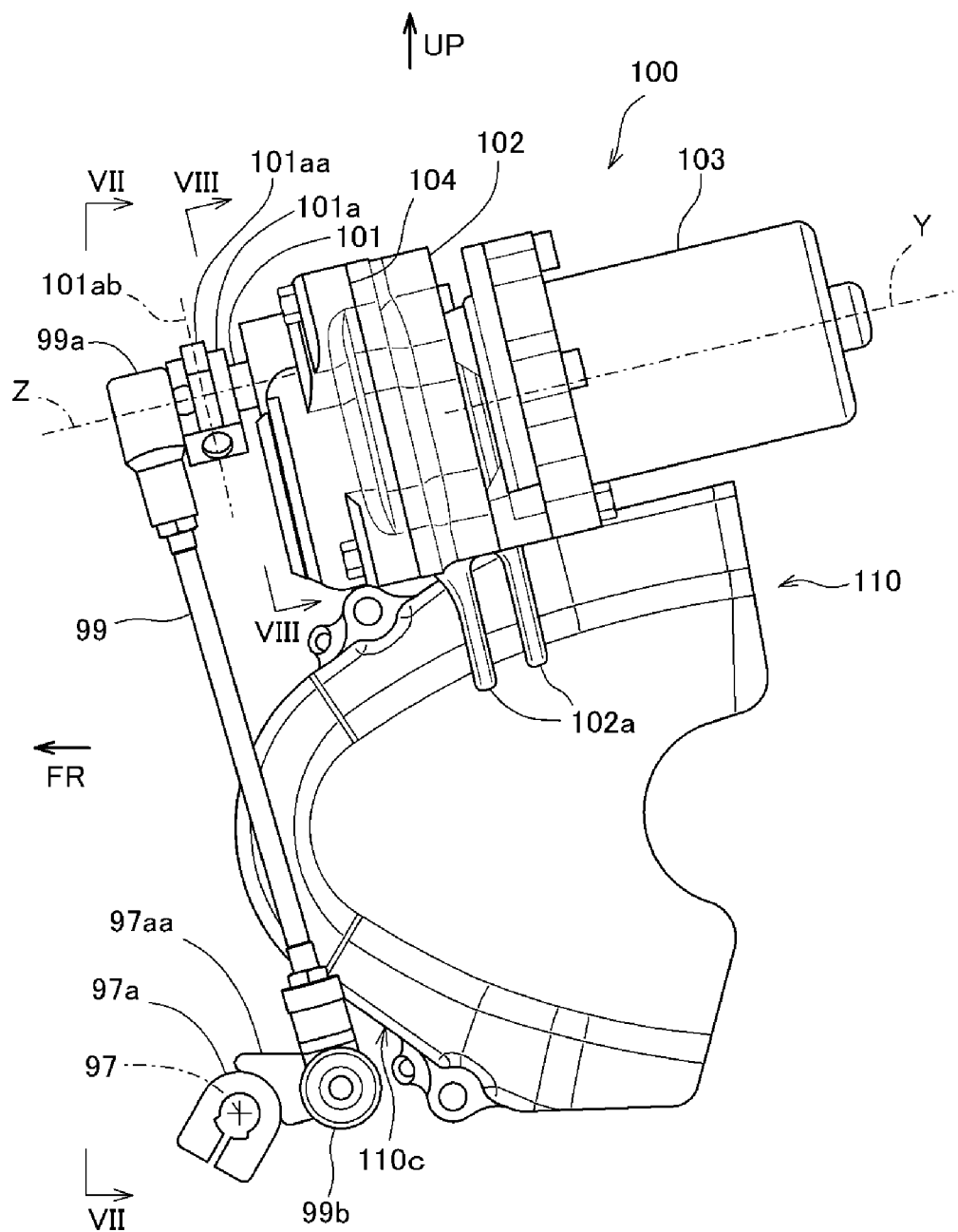
FIG. 6 is an enlarged left side elevational view taken along line VI-VI of FIG. 5, illustrating a drive sprocket cover, a shift actuator, a joint rod, and a shift spindle that are extracted from FIG. 2.

FIG. 6 illustrates the drive sprocket cover 110, the shift actuator 100, the joint rod 99, and the shift spindle 97 that are extracted from FIG. 2, in enlarged left side elevation taken along line VI-VI of FIG. 5.

Figure 7:
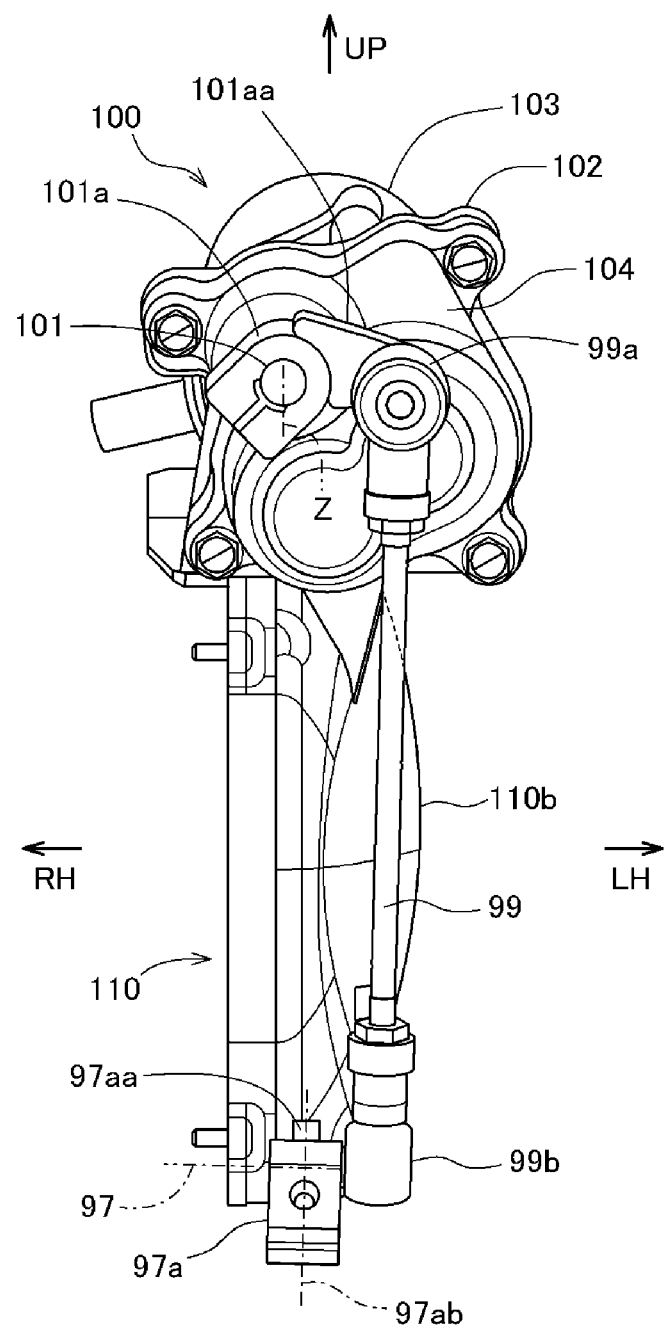
FIG. 7 is a front elevational view taken along line VII-VII of FIG. 6, illustrating the drive sprocket cover, the shift actuator, the joint rod, and the shift spindle.

FIG. 7 illustrates the drive sprocket cover 110, the shift actuator 100, the joint rod 99, and the shift spindle 97 in front elevation taken along line VII-VII of FIG. 6.

The shift actuator 100 includes a gear box 102, an electric motor 103, and a gear box cover 104. The gear box 102 is integrally formed with the drive sprocket cover 110. The gear box 102 has support legs 102*a* integrally formed therewith.

Because the gear box 102 is integrally formed with the drive sprocket cover 110, the gear box 102 does not need to be formed as a part independent of the drive sprocket cover 110, resulting in a reduction in the number of parts used.

As illustrated in FIG. 6, the joint rod 99 has an upper end portion inclined forwardly with respect to its lower end portion as viewed in side elevation of the vehicle.

Consequently, the lower end portion of the joint rod 99, i.e., a pillow ball joint 99*b* according to the present embodiment, can be brought closely to a lower edge 110*c* of the drive sprocket cover 110, and can be prevented from protruding.

Further, as illustrated in FIGS. 5 and 7, the joint rod 99 is positioned closer to the center of the vehicle than an outer side surface 110*b* of the drive sprocket cover 110 as viewed in front elevation of the vehicle.

Therefore, the joint rod 99 is protected from contacting the rider's leg.

As illustrated in FIGS. 1 and 2, the electric motor 103 of the shift actuator 100 has a motor shaft 103*a* oriented in forward and rearward directions along the drive chain 57 extending, i.e., trained, between the drive sprocket 55 and the driven sprocket 56 on the rear wheel 15.

As the motor shaft 103*a* of the electric motor 103 of the shift actuator 100 that is oriented in the forward and rearward directions is disposed over the upper surface 110*a* of the drive sprocket cover 110 that extends in the forward and rearward directions, the shift actuator 100 is disposed in a compact layout.

As illustrated in FIGS. 5 and 6, the electric motor 103 and the gear box cover 104 are mounted in position in sandwiching relation to the gear box 102 such that the electric motor 103 is disposed rearwardly with respect to the gear box 102 and the gear box cover 104 is disposed forwardly with respect to the gear box 102.

The shift actuator 100 to which power of the electric motor 103 is transmitted has an output shaft 101, that is the output shaft 101 of the gear box 102, extending through the gear box cover 104 and oriented forwardly as indicated by an output axis Z.

The electric motor 103 is detachably mounted on the gear box 102 such that the motor shaft 103*a* extends into the gear box 102 from a side that is remote from the gear box cover 104.

Therefore, the electric motor 103 can be mounted on and detached from the gear box 102 without the need for disassembling the gear box 102 and the gear box cover 104. The electric motor 103 thus has increased maintainability.

Particularly, as the electric motor 103 is mounted on a rear side of the gear box 102, the electric motor 103 can be detached in a wide area along the direction in which the drive chain 57 extends. As a consequence, the electric motor 103 can be mounted and detached with ease.

The output shaft 101 of the gear box 102 and the motor shaft 103*a* of the electric motor 103 are disposed respectively on opposite sides of the gear box 102. Therefore, the output shaft 101 has an increased level of layout freedom, and, in addition, the maintainability of the electric motor 103 is increased.

An attachment fitting 101*a* by which the joint rod 99 is attached to the output shaft 101 of the shift actuator 100 has an arm 101*aa* angularly movable about the output axis Z of the output shaft 101, and an attachment fitting 97*a* by which the joint rod 99 is attached to the shift spindle 97 has an arm 97*aa* angularly movable about the shift spindle 97.

The joint rod 99 has pillow ball joints 99*a* and 99*b* respectively on its upper and lower ends. The pillow ball joints 99*a* and 99*b* incorporate spherical bearings therein.

The pillow ball joint 99*a* is connected to the distal end of the arm 101*aa* on the output shaft 101 of the shift actuator 100. When the arm 101*aa* is turned, the pillow ball joint 99*a* moves the joint rod 99 in an axial direction thereof.

The pillow ball joint 99*b* is connected to the distal end of the arm 97*aa* on the shift spindle 97. When the joint rod 99 is moved in the axial direction thereof, the pillow ball joint 99*b* turns the arm 97*aa*, turning the shift spindle 97 about its central axis.

Consequently, rotation of the output shaft 101 of the shift actuator 100 is transmitted to angular movement of the shift spindle 97, so that the shift actuator 100 can actuate the transmission actuating mechanism 9 through the shift spindle 97.

As illustrated in FIGS. 6 and 7, a plane 101*ab* in which the arm 101*aa* on the output shaft 101 operates and a plane 97*ab* in which the arm 97*aa* on the shift spindle 97 operates lie perpendicularly to each other at 90°. The spherical bearings of the pillow ball joints 99*a* and 99*b* allow the arms 101*aa* and 97*aa* to operate in the respective planes 101*ab* and 97*ab*.

Figure 8:
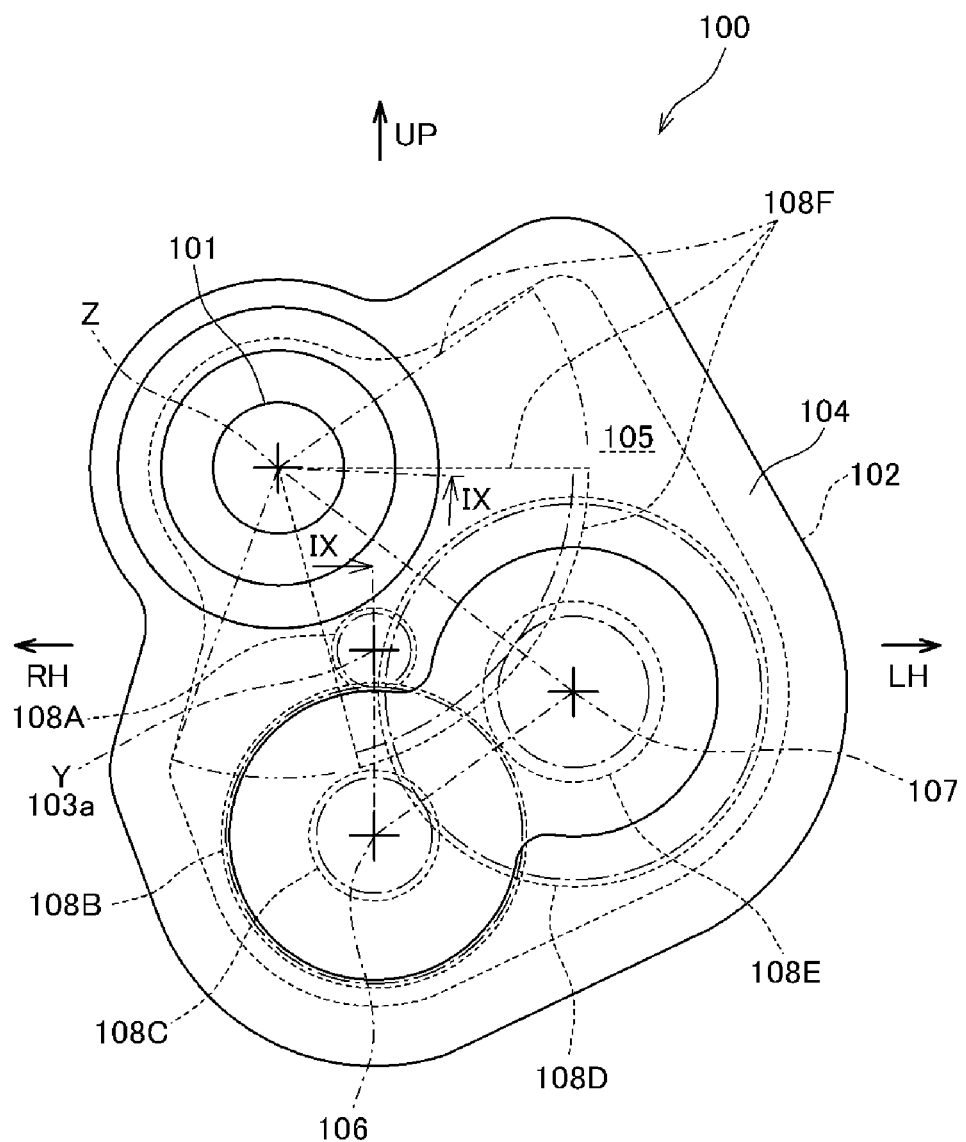
FIG. 8 is a front elevational view of the shift actuator taken along line VIII-VIII of FIG. 6.
Figure 9:
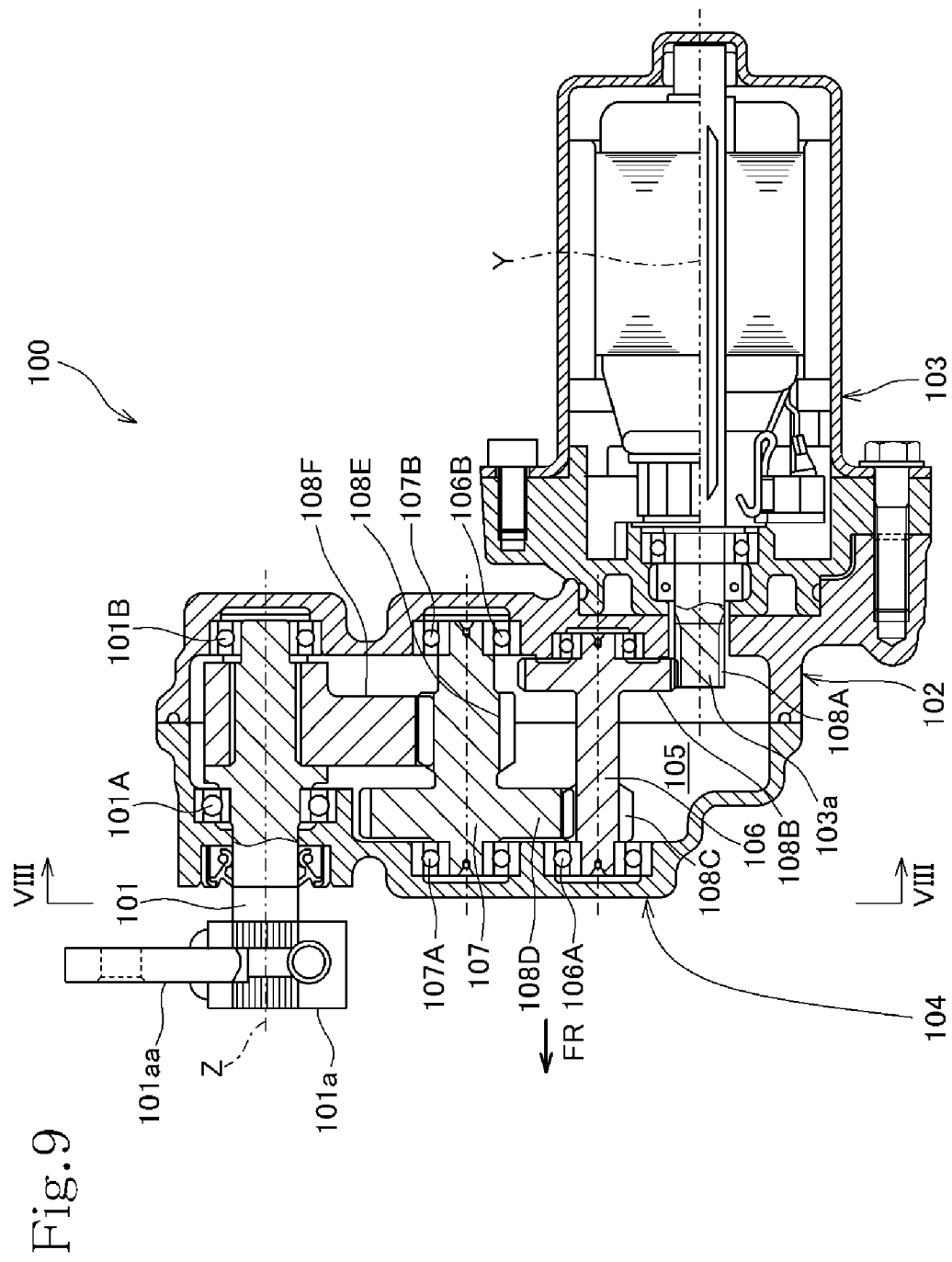
FIG. 9 is a cross-sectional development view of the shift actuator taken along line IX-IX of FIG. 8.

FIG. 8 illustrates the shift actuator 100 in front elevation taken along line VIII-VIII of FIG. 6, and FIG. 9 illustrates the shift actuator 100 in cross-sectional development taken along line IX-IX of FIG. 8.

As illustrated in FIGS. 8 and 9, the output shaft 101 of the shift actuator 100 that projects forwardly from the gear box cover 104 is rotatably supported on the gear box cover 104 and the gear box 102 by bearings 101A and 101B in a speed reducer compartment 105 defined between the gear box cover 104 and the gear box 102.

The electric motor 103 is fastened to a side of the gear box 102 that is remote from the gear box cover 104, and has its motor shaft 103a extending into the speed reducer compartment 105 parallel to the output shaft 101.

As clearly illustrated in FIG. 9, a first speed reducer gear shaft (i.e., speed reducer gear shaft according to the present invention) 106 and a second speed reducer gear shaft (i.e., speed reducer gear shaft according to the present invention) 107 are disposed in the speed reducer compartment 105 between the motor shaft 103a and the output shaft 101 and parallel to the motor shaft 103a. The first speed reducer gear shaft 106 and the second speed reducer gear shaft 107 are rotatably supported on the gear box cover 104 and the gear box 102 by respective pairs of bearings 106A and 106B and bearings 107A and 107B.

The number of speed reducer gear shafts may be increased or reduced depending on a speed reduction ratio to be achieved.

The first speed reducer gear shaft 106 has a first larger-diameter speed reducer gear 108B held in mesh with a pinion 108A on the distal end of the motor shaft 103a and a first smaller-diameter speed reducer gear 108C that is smaller in diameter than the first larger-diameter speed reducer gear 108B.

The second speed reducer gear shaft 107 has a second larger-diameter speed reducer gear (i.e., larger-diameter speed reducer gear according to the present invention) 108D held in mesh with the first smaller-diameter speed reducer gear 108C of the first speed reducer gear shaft 106 and a second smaller-diameter speed reducer gear (i.e., smaller-diameter speed reducer gear according to the present invention) 108E that is smaller in diameter than the second larger-diameter speed reducer gear 108D.

The output shaft 101 has a relatively large-diameter final-stage speed reducer gear 108F held in mesh with the second smaller-diameter speed reducer gear 108E of the second speed reducer gear shaft 107.

As illustrated in FIG. 8, the gear box 102 houses therein a plurality of speed reducer gear shafts, i.e., the first speed reducer gear shaft 106, the second speed reducer gear shaft 107, and the output shaft 101 that has the final-stage speed reducer gear 108F so as to be disposed around the motor shaft 103a in surrounding relation thereto.

Therefore, the first and second speed reducer gear shafts 106 and 107 and the output shaft 101 are disposed in a close-packed layout, preventing the gear box 102 from being increasing in size due to an increased number of speed reduction ratios.

As clearly illustrated in FIG. 8, since the final-stage speed reducer gear 108F on the output shaft 101 in the gear box 102 is of a relatively large diameter, the final-stage speed reducer gear 108F is in the form of a sector gear in view of a limited range of angular movement thereof, and is disposed in overlapping relation to the motor shaft 103a as viewed along its axis.

The layout of the final-stage speed reducer gear 108F makes it possible to reduce the size of the gear box 102 of the shift actuator 100.

The second larger-diameter speed reducer gear 108D of the second speed reducer gear shaft 107 that has the second smaller-diameter speed reducer gear 108E held in mesh with the final-stage speed reducer gear 108F of the output shaft 101 is disposed in overlapping relation to the motor shaft 103a as viewed along its axis.

The layout of the second larger-diameter speed reducer gear 108D makes it possible to further reduce the size of the gear box 102 of the shift actuator 100.

According to the present embodiment, referring to FIGS. 1 and 2, the joint rod 99 that couples the output shaft 101 of the shift actuator 100 and the shift spindle 97 to each other is positioned between the AC generator cover 65c (alternating current generator cover 65c) and the drive sprocket cover 110 as viewed in side elevation of the vehicle.

Therefore, the joint rod 99 stays clear of portions of the AC generator cover 65c and the drive sprocket cover 110 that bulge sideways of the vehicle, and is restrained from protruding sideways of the vehicle.

As illustrated in FIG. 1, the motorcycle 1 according to the present embodiment includes the power unit 3 disposed below the main frame 21 extending rearwardly from the head pipe 20 and the shift actuator 100 having the electric motor 103 that has the motor shaft 103a whose motor axis Y is covered with a lower edge 19a of the vehicle body cover 19 that extends forwardly downwardly and rearwardly upwardly as viewed in side elevation of the vehicle.

Consequently, the electric motor 103 is protected by the vehicle body cover 19 from rainwater that flows downwardly from an upper portion of the motorcycle 1, is cooled by ram air as the electric motor 103 is partly exposed, and has its appearance improved.

FIG. 5 illustrates the power unit 3 in rear elevation taken along line V-V of FIG. 2.

According to the present embodiment, as illustrated in FIG. 5, the joint rod 99 that couples the output shaft 101 and the shift spindle 97 to each other is positioned closer to the center of the vehicle than the AC generator cover 65c as viewed in rear elevation of the vehicle, and is protected from flipped pebbles and stones from the front of the vehicle by a portion of the AC generator cover 65c that bulges sideways of the vehicle forwardly with respect to the joint rod 99.

In the motorcycle 1 according to the present embodiment, as illustrated in FIG. 1, the power unit 3 is mounted on the vehicle body frame 2 below the main frame 21 that extends rearwardly from the head pipe 20, and the upper engine hanger 25 extending downwardly from the main frame 21 and supporting an upper portion of the crankcase 30 and the shift actuator 100 are disposed in respective positions that are staggered in forward and rearward directions of the vehicle as viewed in side elevation of the vehicle.

Further, as illustrated in FIG. 5, the electric motor 103 of the shift actuator 100 is disposed at a corner C defined between a horizontal hypothetical line A extending along the upper surface 110a of the drive sprocket cover 110 and a vertical hypothetical line B extending along an outer side surface 25a of the upper engine hanger 25, as viewed in rear elevation of the vehicle.

Consequently, fastening bolts 25b can be installed easily and efficiently to fasten the upper engine hanger 25 and the power unit 3 to each other, and the shift actuator 100 is prevented from protruding sideways and protected well.

Figure 10:
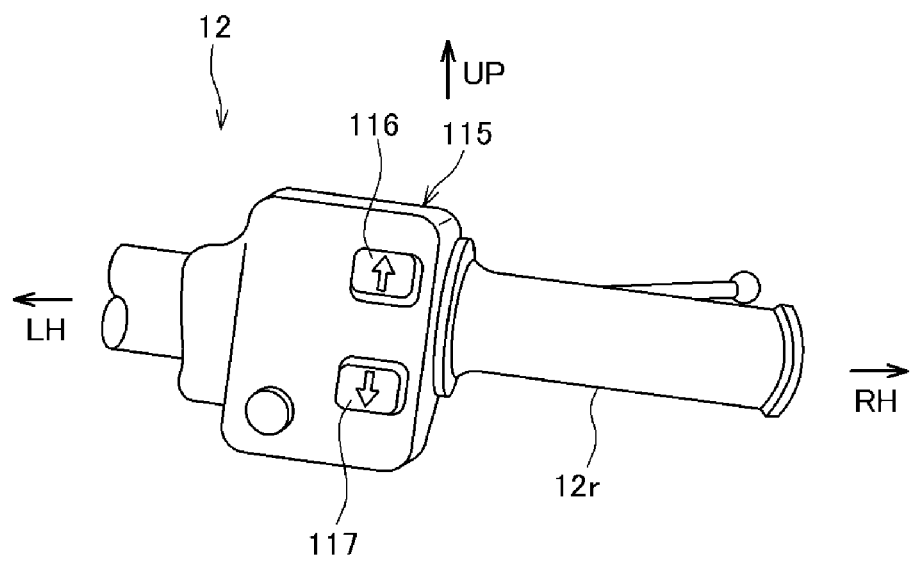
FIG. 10 is a view taken along line X of FIG. 1, illustrating a switch box for operating a transmission actuating mechanism of the motorcycle according to the embodiment.

FIG. 10 illustrates a switch box 115 for operating the transmission actuating mechanism 9 of the motorcycle 1 according to the present embodiment, the view being taken along line X of FIG. 1. The switch box 115 is mounted on the steering handle 12 near a right grip 12r thereon, and includes a shift-up switch 116 and a shift-down switch 117.

When the rider presses the shift-up switch 116 or the shift-down switch 117, the shift actuator 100 is operated to cause the joint rod 99 to turn the shift spindle 97 about its central axis.

When the shift spindle 97 is turned about its central axis, the transmission actuating mechanism 9 for the multistage transmission 5 is actuated to change meshing gears of the main-shaft transmission gear group 51g and the countershaft transmission gear group 52g, selecting a gear position.

The switch box 115 is illustrated by way of example only in FIG. 10. The switch box 115 may be mounted on the steering handle 12 near a left grip thereon, and may include switches for performing other functions.

The embodiment of the present invention has been described above. The present invention is not limited to the illustrated embodiment described above, and various changes and modifications may be made therein within the scope of the present invention.

For example, the saddle-type vehicle is not limited to the motorcycle illustrated in the above embodiment.

The layout of devices has been described according to the embodiment for illustrative purposes. However, the layout of devices may be inverted or switched around horizontally insofar as the inverted layout remains essentially unchanged as to operation and effects.

REFERENCE SIGNS LIST

1 . . . Motorcycle (i.e., saddle-type vehicle according to the present invention), 3 . . . Power unit, 4 . . . Internal combustion engine, 5 . . . Multistage transmission, 9 . . . Transmission actuating mechanism, 12 . . . Steering handle, 12r . . . Right grip, 15 . . . Rear wheel, 19 . . . Vehicle body cover, 19a . . . Lower edge, 20 . . . Head pipe, 21 . . . Main frame (i.e., backbone frame according to the present invention), 22 . . . Pivot frame, 25 . . . Upper engine hanger, 25a . . . Outer side surface, 30 . . . Crankcase, 31 . . . Crankshaft, 51 . . . Main shaft, 52 . . . Countershaft, 55 . . . Drive sprocket, 56 . . . Driven sprocket, 57 . . . Drive chain, 58 . . . Chain cover, 65c . . . AC generator cover, 90 . . . Shift drum, 91 . . . Shift fork, 96 . . . Intermittent feed mechanism, 97 . . . Shift spindle, 98 . . . Master arm, 99 . . . Joint rod, 99a . . . Pillow ball joint, 99b . . . Pillow ball joint, 100 . . . Shift actuator, 101 . . . Output shaft, 102 . . . Gear box, 103 . . . Electric motor, 103a . . . Motor shaft, 104 . . . Gear box cover, 106 . . . First speed reducer gear shaft (i.e., speed reducer gear shaft according to the present invention), 107 . . . Second speed reducer gear shaft (i.e., speed reducer gear shaft according to the present invention), 108D . . . Second larger-diameter speed reducer gear (i.e., larger-diameter speed reducer gear according to the present invention), 108E . . . Second smaller-diameter speed reducer gear (i.e., smaller-diameter speed reducer gear according to the present invention), 108F . . . Final-stage speed reducer gear, 110 . . . Drive sprocket cover (i.e., crankcase cover according to the present invention), 110a . . . Upper surface, 110b . . . Outer side surface, 115 . . . Switch box, 116 . . . Shift-up switch, 117 . . . Shift-down switch, X . . . Cylinder axis, Y . . . Motor axis, Z . . . Output axis, A . . . Horizontal hypothetical axis, B . . . Vertical hypothetical axis, C . . . Corner

The invention claimed is:

1. A saddle-type vehicle comprising:
a power unit including a multistage transmission having a plurality of gear positions,
a transmission actuating mechanism for changing the gear positions,
a shift spindle acting as an input shaft of the transmission actuating mechanism,
a crankcase housing therein the multistage transmission and the transmission actuating mechanism, and
a crankcase cover covering a side portion of the crankcase, wherein
the shift spindle is disposed in a periphery of the crankcase cover and is coupled to a shift actuator mounted on the crankcase cover by a joint rod,
the shift actuator includes a gear box and an electric motor, the gear box being integrally formed with the crankcase cover.

2. The saddle-type vehicle as claimed in claim 1, wherein the crankcase cover is a drive sprocket cover mounted on the side portion of the crankcase and covering a drive sprocket, and the shift actuator is mounted on an upper surface of the drive sprocket cover.

3. The saddle-type vehicle as claimed in claim 2, wherein the joint rod has an upper end portion inclined forwardly with respect to its lower end portion as viewed in side elevation of the vehicle.

4. The saddle-type vehicle as claimed in claim 2, wherein the joint rod is positioned closer to a center of the vehicle than an outer side surface of the drive sprocket cover as viewed in front elevation of the vehicle.

5. The saddle-type vehicle as claimed in claim 2, wherein the electric motor of the shift actuator has a motor shaft oriented in forward and rearward directions of the vehicle along a direction of a drive chain trained between the drive sprocket and a driven sprocket on a rear wheel of the vehicle.

6. The saddle-type vehicle as claimed in claim 5, wherein a gear box cover is mounted on the gear box, and the electric motor is detachably mounted on the gear box.

7. The saddle-type vehicle as claimed in claim 6, wherein the shift actuator to which power of the electric motor is transmitted has an output shaft extending through the gear box cover, and
the electric motor is mounted on the gear box with the motor shaft extending into the gear box from a side that is remote from the gear box cover.

8. The saddle-type vehicle as claimed in claim 7, wherein the gear box houses therein a plurality of speed reducer gear shafts parallel to the motor shaft, and the plurality of speed reducer gear shafts and the output shaft are disposed around the motor shaft so as to surround the motor shaft.

9. The saddle-type vehicle as claimed in claim 8, wherein the gear box houses therein a final-stage speed reducer gear that is a sector gear mounted on the output shaft and is disposed in overlapping relation to the motor shaft as viewed along its axis.

10. The saddle-type vehicle as claimed in claim 9, wherein
one of the speed reducer gear shafts has a smaller-diameter speed reducer gear held in mesh with the final-stage speed reducer gear on the output shaft and a larger-diameter speed reducer gear disposed, at least partially, in overlapping relation to the motor shaft as viewed along its axis.

11. The saddle-type vehicle as claimed in claim 7, wherein the joint rod couples the output shaft and the shift spindle to each other and is positioned between an alternating current generator cover and the drive sprocket cover as viewed in side elevation of the vehicle.

12. The saddle-type vehicle as claimed in claim 11, wherein
the joint rod that couples the output shaft and the shift spindle to each other is positioned closer to a center of the vehicle than the alternating current generator cover as viewed in rear elevation of the vehicle.

13. The saddle-type vehicle as claimed in claim 1, wherein
the power unit is disposed below a backbone frame extending rearwardly from a head pipe, and the electric motor of the shift actuator has a motor axis covered with a lower edge of a vehicle body cover that extends forwardly downwardly and rearwardly upwardly as viewed in side elevation of the vehicle.

14. The saddle-type vehicle as claimed claim 2, wherein
the power unit is mounted on a vehicle body frame below a backbone frame that extends rearwardly from a head pipe, an upper engine hanger extending downwardly from the backbone frame and supporting an upper portion of the crankcase and the shift actuator are disposed in respective positions that are staggered in forward and rearward directions of the vehicle as viewed in side elevation of the vehicle, and the electric motor is disposed at a corner defined between a horizontal hypothetical line extending along the upper surface of the drive sprocket cover and a vertical hypothetical line extending along an outer side surface of the upper engine hanger, as viewed in rear elevation of the vehicle.

15. The saddle-type vehicle as claimed in claim 3, wherein
the electric motor of the shift actuator has a motor shaft oriented in forward and rearward directions of the vehicle along a direction of a drive chain trained between the drive sprocket and a driven sprocket on a rear wheel of the vehicle.

16. The saddle-type vehicle as claimed in claim 4, wherein
the electric motor of the shift actuator has a motor shaft oriented in forward and rearward directions of the vehicle along a direction of a drive chain trained between the drive sprocket and a driven sprocket on a rear wheel of the vehicle.

17. The saddle-type vehicle as claimed in claim 8, wherein
the joint rod couples the output shaft and the shift spindle to each other and is positioned between an alternating current generator cover and the drive sprocket cover as viewed in side elevation of the vehicle.

18. The saddle-type vehicle as claimed in claim 9, wherein
the joint rod couples the output shaft and the shift spindle to each other and is positioned between an alternating current generator cover and the drive sprocket cover as viewed in side elevation of the vehicle.

19. The saddle-type vehicle as claimed in claim 10, wherein
the joint rod couples the output shaft and the shift spindle to each other and is positioned between an alternating current generator cover and the drive sprocket cover as viewed in side elevation of the vehicle.

\* \* \* \* \*